L. T. Hawley,
Milk Cooler.
No. 3559. Reissued July 20. 1869.
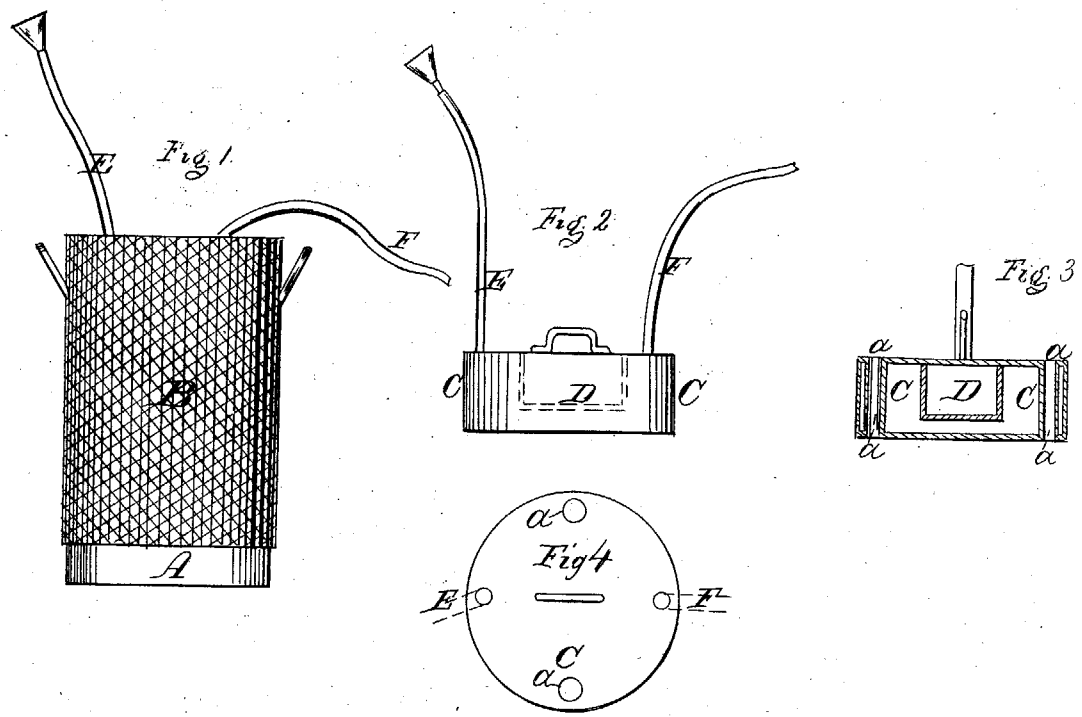
Witnesses.
C. H. Clausen
A. Ruppert
L. T. Hawley
Inventor.
D. P. Holloway & Co
Attys
N. PETERS, PHOTO-LITHOGRAPHER, WASHINGTON, D. C.

United States Patent Office.

LEWIS T. HAWLEY, OF SALINA, NEW YORK.

*Letters Patent No.* 88,476, *dated March* 30, 1869; *reissue No.* 3,559, *dated July* 20, 1869.

IMPROVEMENT IN MILK-COOLERS.

The Schedule referred to in these Letters Patent and making part of the same.

*To all whom it may concern:*

Be it known that I, LEWIS T. HAWLEY, of Salina, in the county of Onondaga, and State of New York, have invented a new and useful Improvement in Milk-Coolers; and I do hereby declare that the following is a full, clear, and exact description thereof, reference being had to the accompanying drawings, and to the letters of reference marked thereon.

Figure 1 is an elevation of my improved cooler.

Figure 2 is an elevation of the float, containing the air-chamber, showing the tubes for the induction and eduction of cold water to and from the float.

Figure 3 is a sectional elevation of the cooler proper, or float, showing the tubes which pass through it.

Figure 4 is a plan view of the same.

Corresponding letters refer to corresponding parts in the several figures.

This invention relates to that class of devices which are termed milk-coolers; and It consists in the construction, combination, and arrangement of its parts, as will be more fully described hereinafter.

A, in the drawings, represents a can, which may be cylindrical in form, and of any size to suit the views of the owner. This can or vessel may be made of tin, or any other suitable sheet-metal, and its lower end may be supplied with a head of the same, or any other suitable material, while its upper end is to be open, to receive its contents, and also to receive the cylindrical vessel or float C, which acts as a cooler to such contents.

B represents a covering of felt, or other suitable material, which is to surround the can, and may be secured thereto by sewing the ends firmly together, and cutting slits, for the passage of the handles of the can. It will be apparent, that by keeping this covering wet with cold water, during the time that the milk remains in the can, the evaporation of the water will take up the heat from the contents of the can, and thereby reduce the temperature of the milk, and the atmosphere will, to a great extent, be excluded from contact with the surface of the can, and that thus the contents thereof will be much more readily cooled, and much more easily maintained in their cooled condition than would be possible without such covering.

C represents the cooler proper, or float. It is a short cylindrical vessel, closed air-tight at both of its ends, and is to be so constructed as to fit snugly, and yet move freely in the can A. Into this vessel cold water is passed, through the induction-pipe E, filling all the space not occupied by the air-chamber D, hereafter to be described, and finding its exit through the eduction-pipe F. Thus a current of cold water is made to pass through such vessel, carrying off the heat imparted thereto by the contents of the can. The vessel C is to be provided with tubes *a a*, of which there may be any required number. These tubes, it will be seen, are to pass entirely through the heads of vessel C, connecting the milk in the can with the air above, and they have the additional purpose of presenting a larger cooling-surface to the contents of the can.

D represents an air-chamber, placed inside of the vessel C, which serves as the buoy to the same, keeping it afloat in the milk of the can; and it is made of sufficient size to effect this when said vessel C is filled with cold water.

E represents a pipe, through which cold water may be forced or allowed to pass to the interior of vessel C. In the present instance, it is made to enter near the outer edge of such vessel, and extends downward to near the bottom thereof, so that as the water enters, the coolest strata thereof will be in contact with the lower head of the vessel, while the warmer portions are being discharged from the top. It is apparent that water may be passed into the vessel C through this pipe continuously, and the same be kept at an even, low temperature.

F represents the eduction-pipe, which, with the induction-pipe, is to be of some flexible elastic substance, and so connected with the vessel, that it may be readily removed when it becomes necessary to transport the cans from place to place.

One of the advantages due to my invention is, that the vessel C may be applied to any of the cylindrical cans now in use, and thus a great saving be made.

Having thus described my invention,

What I claim, and desire to secure by Letters Patent, is—

1. The vessel C, having the air-chamber D, and cooling-tubes *a a*, formed within it, substantially as and for the purpose set forth.

2. The combination of the vessel C with a clothed or covered can or vessel, substantially as and for the purpose described.

In testimony whereof, I have signed my name to this specification, before two subscribing witnesses.

LEWIS T. HAWLEY.

Witnesses:

EVERETT R. LEWIS,
HORACE WHEATON.